(12) United States Patent
Albonesi et al.

(10) Patent No.: US 7,089,443 B2
(45) Date of Patent: Aug. 8, 2006

(54) MULTIPLE CLOCK DOMAIN MICROPROCESSOR

(75) Inventors: David Albonesi, Rochester, NY (US); Greg Semeraro, Fairport, NY (US); Grigorios Magklis, Barcelona (ES); Michael L. Scott, Rochester, NY (US); Rajeev Balasubramonian, Rochester, NY (US); Sandhya Dwarkadas, Rochester, NY (US)

(73) Assignee: University of Rochester, Rochester, NY (US)

( * ) Notice: Subject to any disclaimer, the term of this patent is extended or adjusted under 35 U.S.C. 154(b) by 164 days.

(21) Appl. No.: 10/762,550

(22) Filed: Jan. 23, 2004

(65) Prior Publication Data

US 2005/0060597 A1 Mar. 17, 2005

Related U.S. Application Data

(60) Provisional application No. 60/441,759, filed on Jan. 23, 2003.

(51) Int. Cl.
*G06F 1/04* (2006.01)

(52) U.S. Cl. .......... 713/501; 713/322; 713/600
(58) Field of Classification Search .......... 713/322, 713/500, 501, 600, 320
See application file for complete search history.

(56) References Cited

U.S. PATENT DOCUMENTS

| | | | |
|---|---|---|---|
| 5,309,561 A | 5/1994 | Overhouse et al. | |
| 5,710,910 A | 1/1998 | Kehl et al. | |
| 5,796,995 A | 8/1998 | Nasserbakht et al. | |
| 6,047,382 A | 4/2000 | Maley et al. | |
| 6,463,547 B1 | 10/2002 | Bailey et al. | |
| 6,487,675 B1 | 11/2002 | Sager et al. | |
| 2004/0017234 A1 * | 1/2004 | Tam et al. | 327/141 |
| 2004/0025069 A1 * | 2/2004 | Gary et al. | 713/300 |

* cited by examiner

*Primary Examiner*—Dennis M. Butler
(74) *Attorney, Agent, or Firm*—Blank Rome LLP

(57) ABSTRACT

A multiple clock domain (MCD) microarchitecture uses a globally-asynchronous, locally-synchronous (GALS) clocking style. In an MCD microprocessor each functional block operates with a separately generated clock, and synchronizing circuits ensure reliable inter-domain communication. Thus, fully synchronous design practices are used in the design of each domain.

12 Claims, 8 Drawing Sheets

MULTIPLE CLOCK DOMAIN MICROPROCESSOR

REFERENCE TO RELATED APPLICATION

The present application claims the benefit of U.S. Provisional Patent Application No. 60/441,759, filed Jan. 23, 2003, whose disclosure is hereby incorporated by reference in its entirety into the present disclosure.

STATEMENT OF GOVERNMENT INTEREST

This work was supported in part by NSF grants CCR-9701915, CCR-9702466, CCR-9705594, CCR-9811929, EIA-9972881, CCR-9988361, and EIA-0080124; by DARPA/ITO under AFRL contract F29601-00-K-0182. The government has certain rights in the invention.

FIELD OF THE INVENTION

The present invention is directed to microprocessors and more particularly to microprocessors having multiple clock domains.

DESCRIPTION OF RELATED ART

The continuing push for higher microprocessor performance has led to unprecedented increases in clock frequencies in recent years. While the Pentium III microprocessor broke the 1 GHz barrier in 2000, the Pentium IV is currently shipping at 2 GHz. At the same time, due to issues of reliability and performance, wire dimensions have been scaled in successive process generations more conservatively than transistor dimensions. The result of these frequency and dimensional trends is that microprocessor clock speeds have become increasingly limited by wire delays, so much so that some of the more recent microprocessors, e.g., the Pentium IV [14], have pipeline stages solely dedicated to moving signals across the chip. Furthermore, a growing challenge in future systems will be to distribute the clock across a progressively larger die to increasing numbers of latches while meeting a decreasing clock skew budget. The inevitable conclusion reached by industrial researchers is that in order to continue the current pace of clock frequency increases, microprocessor designers will eventually be forced to abandon singly-clocked globally synchronous systems in favor of some form of asynchrony [8, 24].

Although purely asynchronous systems have the potential for higher performance and lower power compared to their synchronous counterparts, major corporations have been reluctant to fully migrate to asynchronous design methodologies. Two major reasons for this reluctance are the immaturity of asynchronous design tools relative to those in the synchronous domain, and the cost and risk of moving away from the mature design infrastructures that have been successfully used to create many generations of microprocessor products. Yet many existing synchronous designs do incorporate a limited amount of asynchrony. For example, several multiprocessor systems run the memory bus off of a different clock than the processor core in order to allow a single system to accommodate processors of different frequencies. In such dual clock domain systems, the logic in each of the two clock domains is designed using conventional synchronous design methodologies. Well-known and highly-reliable techniques are used to synchronize communication between the two domains, albeit at the cost of extra delay.

An additional trend due to the wire scaling dilemma is to replace microarchitectural techniques requiring long global wires with alternatives requiring only local wiring. This approach improves both clock frequency and the scalability of the design in future process generations. For example, in several microprocessors including the Alpha 21164 and 21264 [11, 20] and the UltraSPARC III [17], the use of global wires to stall early pipeline stages has been replaced by the use of replay traps that cancel instructions and restart the pipeline. Although flushing the pipeline in this manner requires additional cycles for reloading, it results in a higher clock frequency and more scalable implementation due to the elimination of global wires. The designers of the UltraSPARC III fully embraced this approach by creating six functional blocks that run relatively independently of one another, with most long wires eliminated between units [17].

Reference numerals in brackets refer to the following references:

[1] D. H. Albonesi. Dynamic IPC/Clock Rate Optimization. *Proceedings of the 25th International Symposium on Computer Architecture*, pages 282–292, June 1998.

[2] F. Bellosa. OS-Directed Throttling of Processor Activity for Dynamic Power Management. Technical Report TR-14-3-99, C.S. Dept., University of Erlangen, Germany, June 1999.

[3] F. Bellosa. The Benefits of Event-Driven Energy Accounting in Power-Sensitive Systems. In *Proceedings of the 9th ACM SIGOPS European Workshop*, September 2000.

[4] L. Benini, A. Bogliolo, S. Cavallucci, and B. Ricco. Monitoring System Activity for OS-directed Dynamic Power Management. In *Proceedings of the International Symposium on Low-Power Electronics and Design*, August 1998.

[5] D. Brooks, V. Tiwari, and M. Martonosi. Wattch: A Frame-work for Architectural-Level Power Analysis and Optimizations. In *Proceedings of the 27th International Symposium on Computer Architecture*, June 2000.

[6] D. Burger and T. Austin. The Simplescalar Tool Set, Version 2.0. Technical Report CS-TR-97-1342, University of Wisconsin, Madison, Wis., June 1997.

[7] J. Casmira and D. Grunwald. Dynamic Instruction Scheduling Slack. In *Proceedings of the Kool Chips Workshop, in conjunction with the 33rd International Symposium on Microarchitecture* (MICRO-33), December 2000.

[8] B. Chappell. The fine art of IC design. *IEEE Spectrum*, 36(7):30–34, July 1999.

[9] B. R. Childers, H. Tang, and R. Melhem. Adapting Processor Supply Voltage to Instruction-Level Parallelism. In *Proceedings of the Kool Chips Workshop, in conjunction with the 33rd International Symposium on Microarchitecture* (MICRO-33), December 2000.

[10] L. T. Clark. Circuit Design of XScale™ Microprocessors. In 2001 *Symposium on VLSI Circuits, Short Course on Physical Design for Low-Power and High-Performance Microprocessor Circuits*. IEEE Solid-State Circuits Society, June 2001.

[11] J. H. Edmondson et al. Internal Organization of the Alpha 21164, a 300-MHz 64-bit Quad-issue CMOS RISC Microprocessor. *Digital Technical Journal*, 7(1):119–135, 1995. Special Edition.

[12] B. Fields, S. Rubin, and R. Bodik. Focusing Processor Policies via Critical-Path Prediction. In *Proceedings of the 28th International Symposium on Computer Architecture*, July 2001.

[13] M. Fleischmann. Longrun™ power management. Technical report, Transmeta Corporation, January, 2001.

[14] P. N. Glaskowsky. Pentium 4 (Partially) Previewed. *Microprocessor Report,* 14(8):1,11–13, August 2000.

[15] K. Govil, E. Chang, and H. Wasserman. Comparing Algorithms for Dynamic Speed-Setting of a Low-Power CPU. In *Proceedings of the 1st ACM/IEEE International Conference on Mobile Computing and Networking,* pages 13–25, November 1995.

[16] T. R. Halfhill. Transmeta breaks x86 low-power barrier. *Microprocessor Report,* 14(2), February 2000.

[17] T. Horel and G. Lauterbach. UltraSPARC III: Designing Third-Generation 64-Bit Performance. *IEEE Micro,* 19(3):73–85, May/June 1999.

[18] C.-H. Hsu, U. Kremer, and M. Hsiao. Compiler-Directed Dynamic Frequency and Voltage Scaling. In *Proceedings of the Workshop on Power-Aware Computer Systems, in conjunction with the 9th International Conference on Architectural Support for Programming Languages and Operating Systems* (ASPLOS-IX), November 2000.

[19] C. J. Hughes, J. Srinivasan, and S. V. Adve. Saving Energy with Architectural and Frequency Adaptations for Multimedia Applications. In *Proceedings of the 34th Annual International Symposium on Microarchitecture* (MICRO-34), December 2001.

[20] R. E. Kessler, E. J. McLellan, and D. A. Webb. The Alpha 21264 Microprocessor Architecture. In *Proceedings of the International Conference on Computer Design,* pages 90–95, Austin, Tex., October 1998. IEEE Computer Society.

[21] S. Leibson. XScale (StrongArm-2) Muscles In. *Microprocessor Report,* 14(9):7–12, September 2000.

[22] T. Li and C. Ding. Instruction Balance, Energy Consumption and Program Performance. Technical Report UR-CS-TR-739, Computer Science Dept., University of Rochester, December 2000. Revised February 2001.

[23] D. Marculescu. On the Use of Microarchitecture-Driven Dynamic Voltage Scaling. In *Proceedings of the Workshop on Complexity-Effective Design, in conjunction with the 27th International Symposium on Computer Architecture,* June 2000.

[24] D. Matzke. Will Physical Scalability Sabotage Performance Gains? IEEE Computer, 30(9):37–39, September 1997.

[25] T. Pering, T. Burd, and R. W. Brodersen. The Simulation and Evaluation of Dynamic Voltage Scaling Algorithms. In *Proceedings of the International Symposium on Low-Power Electronics and Design,* August 1998.

[26] R. Pyreddy and G. Tyson. Evaluating Design Tradeoffs in Dual Speed Pipelines. In *Proceedings of the Workshop on Complexity-Effective Design, in conjunction with the 28th International Symposium on Computer Architecture,* June 2001.

[27] L. F. G. Sarmenta, G. A. Pratt, and S. A. Ward. Rational Clocking. In *Proceedings of the International Conference on Computer Design,* Austin, Tex., October 1995.

[28] A. E. Sjogren and C. J. Myers. Interfacing Synchronous and Asynchronous Modules Within A High-Speed Pipeline. In *Proceedings of the 17th Conference on Advanced Research in VLSI,* pages 47–61, Ann Arbor, Mich., September 1997.

[29] G. Sohi. Instruction Issue Logic for High-Performance Interruptible, Multiple Functional Unit, Pipelined Computers. *ACM Transactions on Computer Systems,* 39(3):349–359, March 1990.

[30] TSMC Corp. TSMC Technology Roadmap, July 2001.

[31] M. Weiser, A. Demers, B. Welch, and S. Shenker. Scheduling for Reduced CPU Energy. In *Proceedings of the 1st USENIX Symposium on Operating Systems Design and Implementation,* November 1994.

SUMMARY OF THE INVENTION

It is an object of the invention to overcome the above-noted deficiencies of the prior art. It is another object of the invention to provide an approach that allows for aggressive future frequency increases, maintains a synchronous design methodology, and exploits the trend towards making functional blocks more autonomous.

To achieve the above and other objects, the present invention is directed to a multiple clock domain (MCD) microarchitecture, which uses a globally-asynchronous, locally-synchronous (GALS) clocking style. In an MCD microprocessor each functional block operates with a separately generated clock, and synchronizing circuits ensure reliable inter-domain communication. Thus, fully synchronous design practices are used in the design of each domain. Although the inter-domain synchronization increases the number of clock cycles required to run a given application, an MCD microprocessor affords a number of potential advantages over a singly clocked design:

The global clock distribution network is greatly simplified, requiring only the distribution of the externally generated clock to the local Phase Lock Loop (PLL) in each domain.

The independence of each local domain clock implies no global clock skew requirement, permitting potentially higher frequencies within each domain and greater scalability in future process generations.

The designers of each domain are no longer constrained by the speeds of critical paths in other domains, affording them greater freedom in each domain to optimize the tradeoffs among clock speed, latency, and the exploitation of application parallelism via complex hardware structures.

Using separate voltage inputs, external voltage regulators, and controllable clock frequency circuits in each clock domain allows for finer grained dynamic voltage and frequency scaling, and thus lower energy, than can be achieved with single clock, single-core-voltage systems.

With the ability to dynamically resize structures and alter the clock speed in each domain, the IPC/clock rate tradeoff can be tailored to application characteristics within each individual domain [1], thereby improving both performance and energy efficiency.

In the present application, we describe an initial implementation of an MCD microprocessor that is a straightforward extension of a singly-clocked synchronous dynamic superscalar design. By accurately modeling inter-domain synchronization, we characterize the performance and energy costs of the required synchronization circuitry. We then explore the potential benefits of per-domain dynamic voltage and frequency scaling. Our results demonstrate a 20% average improvement in energy-delay product for a set of benchmarks that includes both compute and memory-bound applications. Unlike rate-based multimedia applications, these benchmarks have not traditionally been candidates for voltage and frequency scaling.

We disclose a multiple clock domain (MCD) microarchitecture, which uses a globally-asynchronous, locally-synchronous (GALS) clocking style along with dynamic voltage and frequency scaling in order to maximize performance and energy efficiency for a given application. Our design uses existing queue structures in a superscalar processor core to isolate the different clock domains in a way that minimizes the need for inter-domain synchronization.

Performance results for applications drawn from standard benchmark suites suggest that the division of the processor into multiple domains incurs an average baseline performance cost of less than 4%. At the same time, by scaling frequency and voltage in different domains dynamically and independently, we can achieve an average improvement in energy-delay product of nearly 20%. By contrast, global voltage scaling to achieve comparable performance degradation in a singly clocked microprocessor achieves an average energy-delay improvement of only 3%.

Our current analysis uses an off-line algorithm to determine the points in the program at which different domains should change frequency and voltage. Variations within the scope of the invention include effective on-line algorithms, including approaches for effective scaling of the front end, as well as the ability to deliver tunable on-chip voltage and frequency with low latency.

The following paper describes the invention and is hereby incorporated by reference in its entirety into the present disclosure: Semeraro et al, "Energy-Efficient Processor Design Using Multiple Clock Domains with Dynamic Voltage and Frequency Scaling," *High Performance Computer Architecture* (HPCA), Feb. 2, 2002.

BRIEF DESCRIPTION OF THE DRAWINGS

A preferred embodiment of the present invention will be disclosed in detail with reference to the drawings, in which.

DETAILED DESCRIPTION OF THE PREFERRED EMBODIMENT

Matzke has estimated that as technology scales down to a 0.1 μm feature size, only 16% of the die will be reachable within a single clock cycle [24]. Assuming a chip multiprocessor with two processors per die, each processor would need to have a minimum of three equal-size clock domains. The preferred embodiment uses four domains, one of which includes the L2 cache, so that domains may vary somewhat in size and still be covered by a single clock. In effect, we treat the main memory interface as a fifth clock domain, external to the MCD processor, and always running at full speed.

Figure 1:
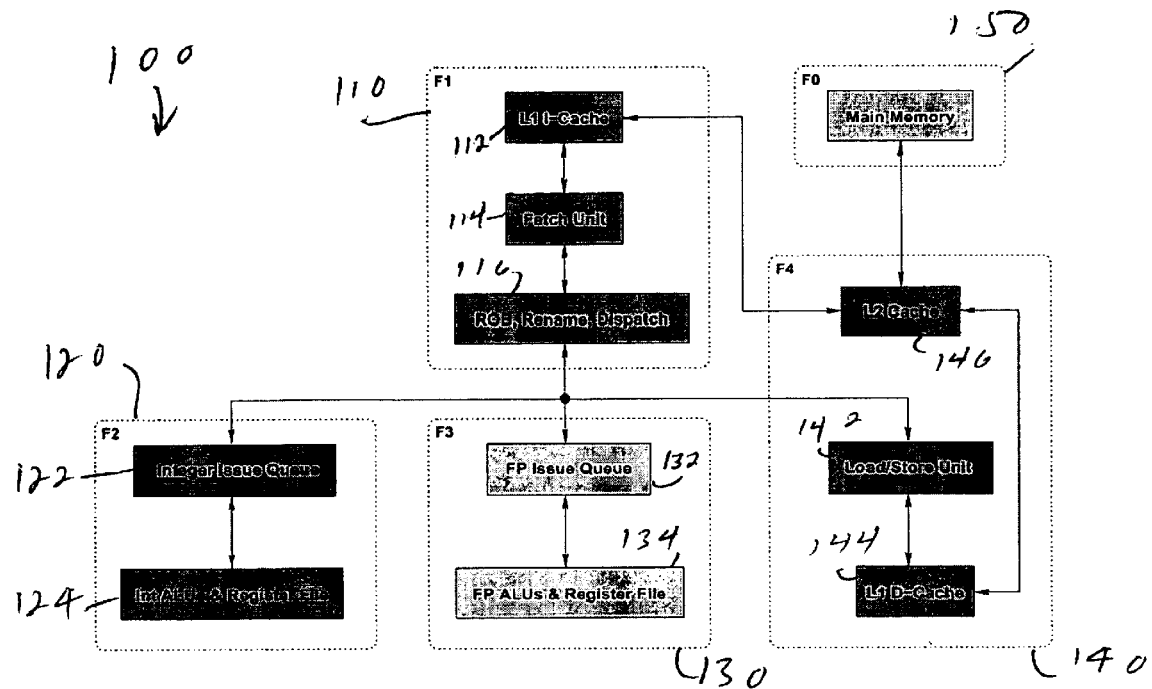
FIG. 1 shows a multiple clock domain processor block diagram.

In choosing the boundaries between domains, we attempted to identify points where (a) there already existed a queue structure that served to decouple different pipeline functions, or (b) there was relatively little inter-function communication. Our four chosen domains, shown in the architecture 100 of FIG. 1, comprise the front end 110 (including instruction cache 112, fetch unit 114, and branch prediction, rename, and dispatch 116); integer issue/execute 120 (including integer issue queue 122 and integer arithmetic logic units and register file 124); floating point issue/execute 130 (including floating point issue queue 132 and floating point arithmetic logic units and register file 134); and load/store issue/execute 140 (including load/store unit 142, L1 D-cache 144, and L2 cache 146 in communication with the main memory interface 150 as well as with the cache 112 of the front end 110). Although we were initially concerned about the performance impact of implementing separate load/store and integer domains, we discovered that the additional synchronization penalty did not significantly degrade performance. Furthermore, because we discovered no energy savings from decoupling instruction fetch from rename/dispatch, we combined these regions into a single fetch/rename/dispatch domain to eliminate their inter-domain synchronization overhead. Finally, execution units of the same type (e.g., integer units) were combined into a single domain to avoid the high cost of synchronizing the bypass and register file data paths among these units. As a result of these divisions, there were no explicit changes to the pipeline organization of the machine. We also believe that these divisions would result in a physically realizable floorplan for an MCD processor.

The primary disadvantage of an MCD processor is the performance overhead due to inter-domain synchronization. In this section, we discuss the circuitry required to perform this synchronization. We discuss how to model its performance cost below.

Some synchronization schemes restrict the phase relationship and relative frequencies of the clocks, thereby eliminating the need for hardware arbitration [27]. Unfortunately, these schemes impose significant restrictions on the possible choices of frequencies. In addition, the need to control the phase relationships of the clocks means that global clock synchronization is required. Our design specifically recognizes the overhead associated with independent clocks with no known phase relationship. We believe this overhead to be unavoidable in an MCD processor: one of the motivating factors for the design is the recognition that traditional global clock distribution will become increasingly difficult in the future.

The issue queues in the integer, floating point, and load/store domains (the Load/Store Queue within the Load/Store Unit), together with the Reorder Buffer (ROB) in the front end domain, serve to decouple the front and back ends of a conventional processor. Choosing these queues as inter-domain synchronization points has the advantage of hiding the synchronization cost whenever the queue is neither full nor empty (as described below).

Figure 2:
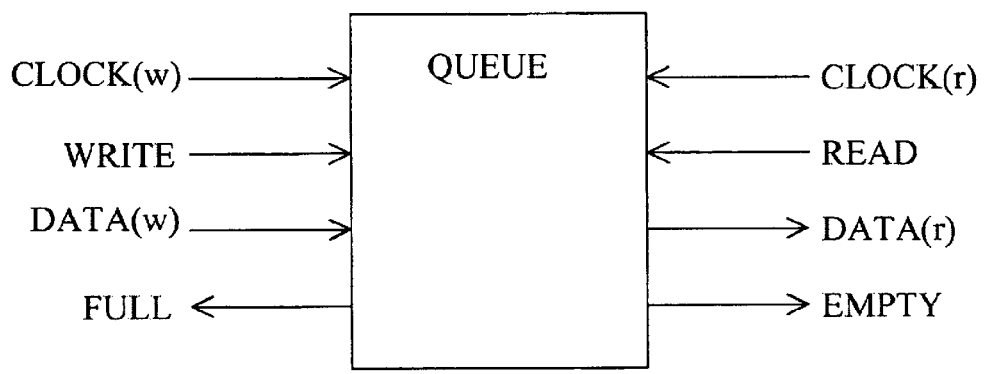
FIG. 2 shows a queue structure.

The general queue structure that we use for inter-domain communication is shown in FIG. 2. The assertion of the Full flag indicates to the producer that it can no longer write to the queue until the flag is deasserted ($\overline{\text{Full}}$), while the Empty flag when asserted indicates that there is no valid data for the consumer to read from the queue. The consumer waits until Empty is deasserted before reading again.

The use of a full handshake protocol for this interface requires that the producer/consumer check the Full/Empty flag after every operation in order to avoid queue overruns on writes or reads from an empty queue. This requirement significantly slows down the interface, thereby degrading performance. Rather, we assume that the Full and Empty flags are generated far enough in advance such that writes and reads can occur every clock cycle without over- or underflowing the queue. In other words, the Full flag is generated early enough such that a burst of writes every cycle will terminate (due to recognition by the producer of the assertion of the Full flag) just as the last remaining queue entry has been written. An analogous situation exists for the consumer side of the queue, although our particular queues are different in this regard as we discuss later. Note that this scheme may result in underutilization of the queue under particular conditions. For example, if the write that initiates assertion of the Full flag is at the end of a burst, then there will be empty but unusable entries in the queue (because the Full flag will have been asserted) the next time the producer has data to write into the queue.

In order to avoid underutilization of the queues, we assume extra queue entries to buffer writes under worst-case conditions so that the original number of queue entries can be fully utilized. In the MCD design, the worst-case situation occurs when the producer is operating at the maximum frequency (max_freq) and the consumer at the minimum frequency (min_req). An additional complication occurs due to the need to compare queue head and tail pointers from different clock domains in order to generate the Full and Empty flags. Under these conditions, and assuming an additional cycle for the producer to recognize the Full signal, (max_freq/min_freq)+1 additional entries are required. Our results do not account for the performance advantage nor the energy cost of these additional entries.

Figure 3:
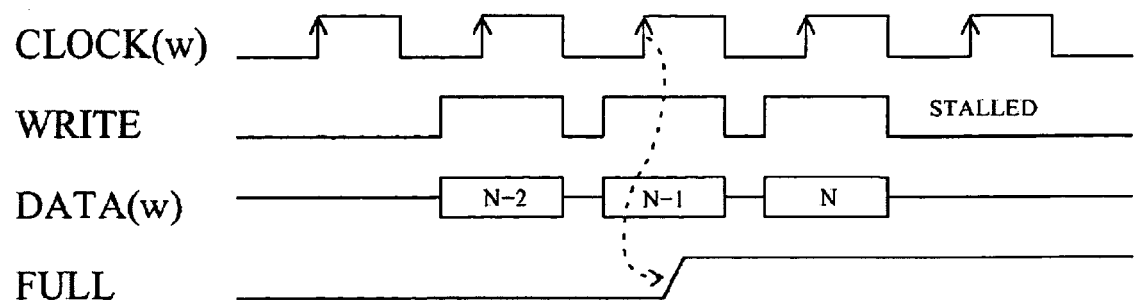
FIG. 3 shows a full flag.

Even with completely independent clocks for each interface, the queue structure is able to operate at full speed for both reading and writing under certain conditions. This concurrency requires a dual-ported SRAM structure where simultaneous read and write cycles are allowed to different SRAM cells. As long as the interfaces are designed to adhere to the protocol associated with the Full and Empty flags, the queue structure does not need to support simultaneous read and write access to the same SRAM cell. As long as the queue is not full (as described above) the producer can continue to write data on every rising edge of $Clock_w$ (FIG. 3). Similarly, so long as the queue is not empty, the consumer can continue reading on every rising edge of $Clock_r$. Therefore, both interfaces operate at full speed so long as the queue is partially full, although newly written entries may not be recognized by the consumer until after a synchronization period. Once the queue becomes full, the queue state of $\overline{Full}$ can only result from data being read out of the queue on the read interface. When this event occurs, the queue pointer in the read domain must get synchronized with the write domain clock ($Clock_w$) in order to dessert Full. A similar desynchronization delay occurs with the generation of the $\overline{Empty}$ condition due to a write to an empty queue.

Many of the queues that we use as synchronization points have a different interface than that described above. For the issue queue for example, each entry has Valid and Ready flags that the scheduler uses to determine whether an entry should be read (issued). The scheduler by design will never issue more than the number of valid and ready entries in the queue. Note, however, that due to synchronization, there is a delay before the scheduler sees newly written queue data. The delay associated with crossing a clock domain interface is a function of the following:

The synchronization time of the clock arbitration circuit, $T_S$, which represents the minimum time required between the source and destination clocks in order for the signal to be successfully latched at the destination. We assume the arbitration and synchronization circuits developed by Sjogren and Myers [28] that detect whether the source and destination clock edges are sufficiently far apart (at minimum, $T_S$) such that a source-generated signal can be successfully clocked at the destination. The destination clock is enabled only under these conditions. We assume a $T_S$ of 30% of the period of the highest frequency.

The ratio of the frequencies of the interface clocks.

The relative phases of the interface clocks.

Figure 4:
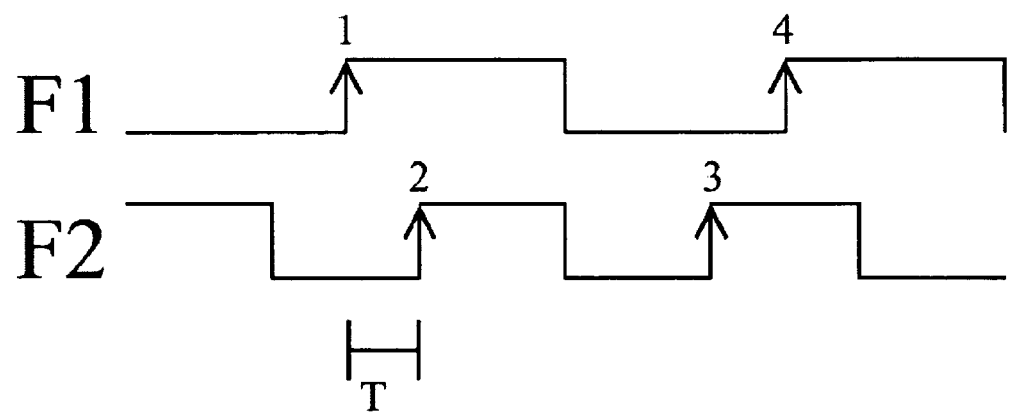
FIG. 4 shows synchronization timing.

This delay can best be understood by examining a timing diagram (FIG. 4), which shows source clock $F_1$ and destination clock $F_2$. Consider the case when the queue is initially empty. Data is written into the queue on the rising edge of $F_1$ (edge 1). Data can be read out of the queue as early as the next rising edge of $F_2$. If $T \leq T_S$, the earliest that the data can be read is one $F_2$ period later (edge 3). This extra delay represents one source of performance degradation due to synchronization. The value of T is determined by the relative frequency and phases of $F_1$ and $F_2$, as well as the relative jitter of the clock sources, and may well change over time. The cost of synchronization is controlled by the relationship between T and $T_S$, and to a lesser degree by the magnitude of $T_S$. The analogous situation exists when the queue is Full, replacing Empty with Full, edge 1 with edge 2, and edge 3 with edge 4 in the above discussion.

Our simulator, described below, accurately accounts for the inter-domain overhead.

Our simulation testbed is based on the SimpleScalar toolset [6] with the Wattch [5] power estimation extensions. The original SimpleScalar model supports out of order execution using a centralized Register Update Unit (RUU) [29]. We have modified this structure to more closely model the microarchitecture of the Alpha 21264 microprocessor [20]. Specifically, we split the RUU into separate reorder buffer (ROB), issue queue, and physical register file structures. A summary of our simulation parameters appears in Table 1.

TABLE I

Architectural parameters for simulated processor
Branch predictor: comb. of bimodal and 2-level PAg

| | |
|---|---|
| Level1 | 1024 entries, history 10; |
| Level2 | 1024 entries; |
| Bimodal predictor size | 1024; |
| Combining predictor size | 4096; |
| BTB | 4096 sets, 2-way |
| Branch Mispredict Penalty | 7 |
| Decode Width | 4 |
| Issue Width | 6 |
| Retire Width | 11 |
| L1 Data Cache | 64 KB, 2-way set associative |
| L1 Instruction Cache | 64 KB, 2-way set associative |
| L2 Unified Cache | 1 MB, direct mapped |
| L1 cache latency | 2 cycles |
| L2 cache latency | 12 cycles |
| Integer ALUs | 4 + 1 mult/div unit |
| Floating-Point ALUs | 2 + 1 mult/div/sqrt unit |
| Integer Issue Queue Size | 20 entries |
| Floating-Point Issue Queue Size | 15 entries |
| Load/Store Queue Size | 64 |
| Physical Register File Size | 72 integer, 72 floating-point |
| Reorder Buffer Size | 80 |

We selected a mix of compute-bound, memory-bound, and multimedia applications from the MediaBench, Olden, and SPEC2000 benchmark suites. Table 2 specifies the benchmarks used along with the window of instructions simulated. We show combined statistics for the encode and decode phases of adpcm, epic, and g721, and for the mipmap, osdemo, and texgen phases of mesa.

TABLE 2

Benchmarks

| Bench-mark | Suite | Datasets | Simulation window (instructions) |
|---|---|---|---|
| adpcm | Media- | ref | entire program |
| epic | Bench | ref | entire program |
| g721 | | ref | 0–200 M |
| mesa | | ref | entire program |
| em3d | Olden | 4 K nodes, arity 10 | 70 M–119 M |
| health | | 4 levels, 1 K iters | 80 M–127 M |
| mst | | 1 K nodes | entire program 199 M |
| power | | ref | 0–200 M |
| treeadd | | 20 levels, 1 iter | entire program 189 M |
| tsp | | ref | 0–200 M |
| bzip2 | SPEC | input.source | 1000 M–1100 M |
| gcc | 2000 Int | 166.i | 1000 M–1100 M |
| mcf | | ref | 1000 M–1100 M |
| parser | | ref | 1000 M–1100 M |
| art | SPEC | ref | 300 M–400 M |
| swim | 2000 FP | ref | 1000 M–1100 M |

For the baseline processor, we assume a 1 GHz clock and 1.2 V supply voltage, based on that projected for the forth-coming CL010LP TSMC low-power 0.1 μm process [30]. For configurations with dynamic voltage and frequency scaling, we assume 32 frequency points spanning a linear range from 1 GHz down to 250 MHz. Corresponding to these frequency points is a linear voltage range from 1.2 V down to 0.65 V. In Wattch, we simulate the effect of a 1.2–0.65 V voltage range by using a range of 2.0–1.0833 V because Wattch assumes a supply voltage of 2.0 V. Our voltage range is tighter than that of XScale (1.65–0.75 V), reflecting the compression of voltage ranges in future generations as supply voltages continue to be scaled aggressively relative to threshold voltages. In addition, the full frequency range is twice that of the full voltage range. As we demonstrate below, these factors limit the amount of power savings that can be achieved with conventional dynamic voltage and frequency scaling.

We assume two models for dynamic voltage and frequency scaling: an XScale model and a Transmeta model, both of which are based on published information from the respective companies [10, 13]. For both of these models, we assume that the frequency change can be initiated immediately when transitioning to a lower frequency and voltage, while the desired voltage must be reached first before increasing frequency. For the Transmeta model, we assume a total of 32 separate voltage steps, at 28.6 mV intervals, with a voltage adjustment time of 20 μs per step. Frequency changes require the PLL to re-lock. Until it does the domain remains idle. We model the PLL as a normally distributed locking circuit with a mean time of 15 μs and a range of 10–20 μs. For the XScale model, we assume that frequency changes occur as soon as the voltage changes, i.e., as the voltage is changed, the frequency is changed accordingly. There is no penalty due to a domain being idle waiting for the PLL: circuits execute through the change. To approximate a smooth transition, we use 320 steps of 2.86 mV each, with 0.1718 μs required to transition from one step to the next. Traversing the entire voltage range requires 640 μs under the Transmeta model and 55 μs under the XScale model.

Processor reconfiguration decisions (choices of times, frequencies, and voltages) could in principle be made in hardware, software, or some combination of the two, using information gathered from static analysis, on-line statistics, or feedback-based profiling. For the purposes of the current study we have attempted to identify the energy savings that might be achieved with good quality control algorithms, without necessarily determining what those algorithms should look like. More concretely, we employ an off-line tool that analyzes a trace collected during a full-speed run of an application in an attempt to determine the minimum frequencies and voltages that could have been used by various domains during various parts of the run without significantly increasing execution time. A list of these frequencies and voltages—and the times they should be applied—is then fed back into our processor simulator in the course of a second, dynamic scaling run, to obtain accurate estimates of energy and performance.

It is unclear whether this experimental methodology will overestimate or underestimate the benefits that might be achieved by realistic on-line control algorithms: our feedback-based system can in principle use future knowledge, but it is not provably optimal: a good on-line strategy might conceivably do better. What the methodology does provide is an existence proof: with the frequencies and voltages chosen by our analysis tool one could expect to realize the energy savings described below.

The two subsections that follow describe, respectively, our multiple clock domain simulator and the analysis tool used to choose reconfiguration points.

The disadvantage of multiple clock domains is that data generated in one domain and needed in another must cross a domain boundary, potentially incurring synchronization costs as described in Section 2. In order to accurately model these costs, we account for the fact that the clocks driving each domain are independent by modeling independent jitter, the variation in the clock, on a cycle-by-cycle basis. Our model assumes a normal distribution of jitter with a mean of zero. The standard deviation is 110 ps, consisting of an external Phase Lock Loop (PLL) jitter of 100 ps (based on a survey of available ICs) and 10 ps due to the internal PLL. These values assume a 1 GHz on-chip clock generated from a common external 100 MHz clock source. Despite the common use of the external clock, because the local clock sources are independent, the clock skew within individual domains is not a factor when calculating inter-domain penalties.

Our simulator tracks the relationships among all of the domain clocks on a cycle-by-cycle basis based on their scaling factors and jitter values. Initially, all the clocks are randomized in terms of their starting times. To determine the time of the next clock pulse in a domain, the domain cycle time is added to the starting time, and the jitter for that cycle (which may be a positive or negative value) is obtained from the distribution and added to this sum. By performing this calculation for all domains on a cycle by cycle basis, the relationship between all clock edges is tracked. In this way, we can accurately account for synchronization costs due to violations of the $T > T_S$ relationship or to inter-domain clock rate differences.

For all configurations, we assume that all circuits are clock gated when not in use. We do not currently estimate the power savings or clock frequency advantage (due to reduced skew) from the absence of a conventional global clock distribution tree that supplies a low-skew clock to all chip latches.

To select the times and values for dynamic scaling in a given application, our reconfiguration tool begins by running the application on the simulator, at maximum speed. During this initial run we collect a trace of all primitive events (temporally contiguous operations performed on behalf of a single instruction by hardware in a single clock domain), and of the functional and data dependences among these events. For example, a memory instruction (load/store) is broken down into five events: fetch, dispatch, address calculation, memory access, and commit. Data dependences link these events in temporal order. Functional dependences link each event to previous and subsequent events (in different instructions) that use the same hardware units. Additional functional dependences capture the limited size of structures such as the fetch queue, issue queues, and reorder buffer. In the fetch queue, for example, event n depends on event n-k, where k is the size of the queue.

We use our trace information to construct a dependence directed acyclic graph (DAG) for each 50K cycle interval. (The length of this interval is chosen to be the maximum for which the DAG will fit in cache on our simulation servers.) Once the DAG has been constructed, we proceed through two additional analysis phases. The first phase uses the DAG as input, and confines its work to a single interval. Its purpose is to "stretch" (scale) individual events that are not on the application's critical execution path, as if they could, on an instruction-by-instruction basis, be run at a lower frequency. The final phase uses summary statistics from the first phase in order to cluster intervals into larger contiguous periods of time, with a uniform clock rate for each.

Whenever an event in the dependence DAG has two or more incoming arcs, it is possible—in fact likely—that one arc will constitute the critical path and that the others will have "slack". This slack indicates that the previous operation completed earlier than necessary. If all of the outgoing arcs of an event have slack, then we have an opportunity (assuming zero-cost scaling) to save energy by performing the event at a lower frequency and voltage. With each event in the DAG we associate a power factor whose initial value is based on the relative power consumption of the corresponding clock domain, as determined by parameters in Wattch. When we stretch an event we scale its power factor accordingly. Calculations are made on a relative basis, on the assumption that energy is proportional to the square of the clock frequency. The stretching phase of our reconfiguration tool uses a "shaker" algorithm to distribute slack and scale edges as uniformly as possible. Since SimpleScalar, like any real processor, executes events as soon as possible subject to dependences and hazards, slack always appears at the ends of non-critical paths in the original execution trace. The shaker algorithm thus begins at the end of its 50K cycle interval and works backwards through the DAG. When it encounters an event whose outgoing edges all have slack, the shaker checks to see whether the power factor of the event exceeds a certain threshold, originally set to be slightly below the maximum power of any event in the graph. If so (this is a high-power event), the shaker scales the event until either it consumes all the available slack or its power factor drops below the current threshold. If any slack remains, the event is moved later in time, so that as much slack as possible is moved to its incoming edges. When it reaches the beginning of the DAG, the shaker reverses direction, reduces its power threshold by a small amount, and makes a new pass forward through the DAG, scaling high-power events and moving slack to outgoing edges. It repeats this process, alternately passing forward and backward over the DAG, reducing its power threshold each time, until all available slack has been consumed, or until all events adjacent to slack edges have been scaled down to one quarter of their original frequency. When it completes its work for a given 50K cycle interval, the shaker constructs a summary histogram for each clock domain. Each histogram indicates, for each of the 320 frequency steps in the XScale model (being the maximum of the number of steps for the two models), the total number of cycles for the events in the domain and interval that have been scaled to run at or near that frequency.

Unfortunately, it turns out to be difficult to capture the behavior of the front end in terms of dependences among events. Unlike the time between, say, the beginning and the end of an add in the floating-point domain, the time between fetch and dispatch is not a constant number of cycles. In addition, experiments with manually selected reconfiguration points suggested that scaling of the front was seldom as beneficial as scaling of other domains. As a result, we have chosen to run the front at a steady 1 GHz, and to apply the shaker algorithm to events in the other 3 domains only. Since the front end typically accounts for 20% of the total chip energy, this choice implies that any energy improvements we may obtain must come from the remaining 80%. Future attempts to address the front end may yield greater savings than are reported here.

The final, clustering phase of our off-line analysis tool recognizes that frequencies cannot change on an instantaneous, instruction-by-instruction basis. It also allows for a certain amount of performance degradation. Using the histograms generated by the shaker, we calculate, for each clock domain and interval, the minimum frequency f that would permit the domain to complete its work with no more than d percent time dilation, where d is a parameter to the analysis. More specifically, we choose a frequency (from among 32 possible values for Transmeta and from among 320 possible values for XScale) such that the sum, over all events in higher bins of the histogram, of the extra time required to execute those events at the chosen frequency is less than or equal to d percent of the length of the interval. This calculation is by necessity approximate. It ignores ILP within domains: it assumes that the dilations of separate events in the same domain will have a cumulative effect. At the same time it ignores most dependences across domains: it assumes that the dilations of events in different domains will be independent. As an exception to this rule, we add the events of the load/store domain into the histogram of the integer domain. This special case ensures that effective address computations occur quickly when memory activity is high. For most applications the overall time dilation estimate turns out to be reasonably accurate: FIGS. 5–7 and 8A–9B show performance degradation (with respect to the MCD baseline) that is roughly in keeping with d.

Whereas the shaker algorithm assumes that reconfiguration is instantaneous and free, the clustering algorithm must model reconfiguration times and costs. For each adjacent pair of intervals for a given domain, it merges histograms on a bin-by-bin basis and calculates the minimum frequency that would allow us to run the larger, combined interval at a single frequency. For the Transmeta power model we require that the time dilation of too-slow events together with the time required to reconfigure at interval boundaries not exceed d percent of total execution time. Since it eliminates one reconfiguration, merging intervals under the Transmeta model often allows us to run the combined interval at a lower frequency and voltage, thereby saving energy. Most mergers under the XScale model occur when adjacent intervals have identical or nearly identical target frequencies. The clustering algorithm continues to perform mergers, recursively, so long as it is profitable from an energy standpoint to do so.

When it is done performing mergers, the clustering algorithm calculates the times at which reconfiguration must begin in order to reach target frequencies and voltages at target times. If reconfiguration is not possible, for example, because of a large swing in frequency that would take longer (because of the time to reduce or increase voltage) than the available interval, it is avoided. Since transitions in the Transmeta model take 20 µs per voltage level, this results in the inability to accommodate short intervals with a large frequency variance. The algorithm completes its work by writing a log file that specifies times at which the application could profitably have requested changes in the frequencies and voltages of various domains. This file is then read by the processor simulator during a second, dynamic configuration run.

In this section, we compare the performance, energy, and energy-delay product of the MCD microarchitecture to that of a conventional singly clocked system. The base-line configuration is a single clock 1 GHz Alpha 21264-like system with no dynamic voltage or frequency scaling. The baseline MCD configuration is split into four clock domains as described in Section 2 but with the frequency of all clocks statically set at 1 GHz. This configuration serves to quantify the performance and energy cost of inter-domain synchronization. The dynamic 1% and dynamic 5% configurations are identical to baseline MCD except that they support dynamic voltage and frequency scaling within each clock domain. For the dynamic 1% case the clustering phase of our off-line reconfiguration tool uses a target of 1% performance degradation (beyond that of baseline MCD); for the dynamic 5% case it uses a target of 5%. Finally, the global configuration models the baseline configuration with the addition of dynamic scaling of its single voltage and frequency, and serves to quantify the benefits of multiple clock domains.

The frequency for the global case is set so as to incur an overall performance degradation equal to that of the dynamic 5% configuration, and its voltage is correspondingly reduced. The energy savings of global is calculated by running each application under SimpleScalar and Wattch using the reduced frequency and voltage values. This approach permits the energy savings of the MCD approach to be compared to that of conventional voltage and frequency scaling for the same level of performance degradation. We performed a sanity check of the energy results of the global configuration by comparing the Wattch results against a simple calculation of the energy of the baseline configuration scaled relative to the square of the voltage ratios and found the results to agree to within 2%.

Figure 5:
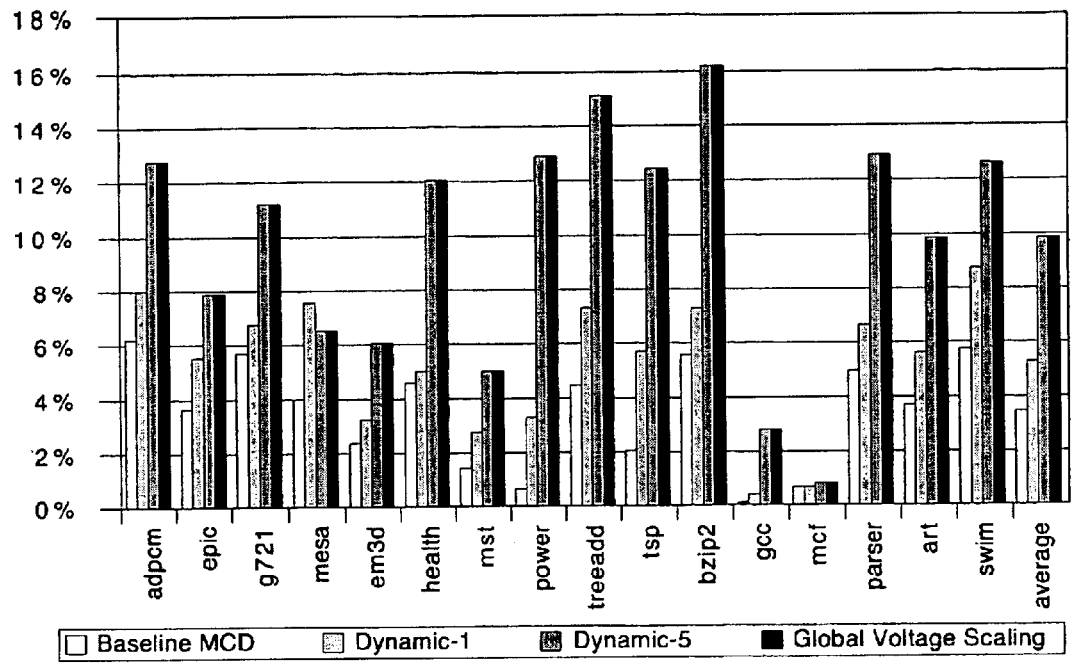
FIG. 5 shows performance degradation results.
Figure 6:
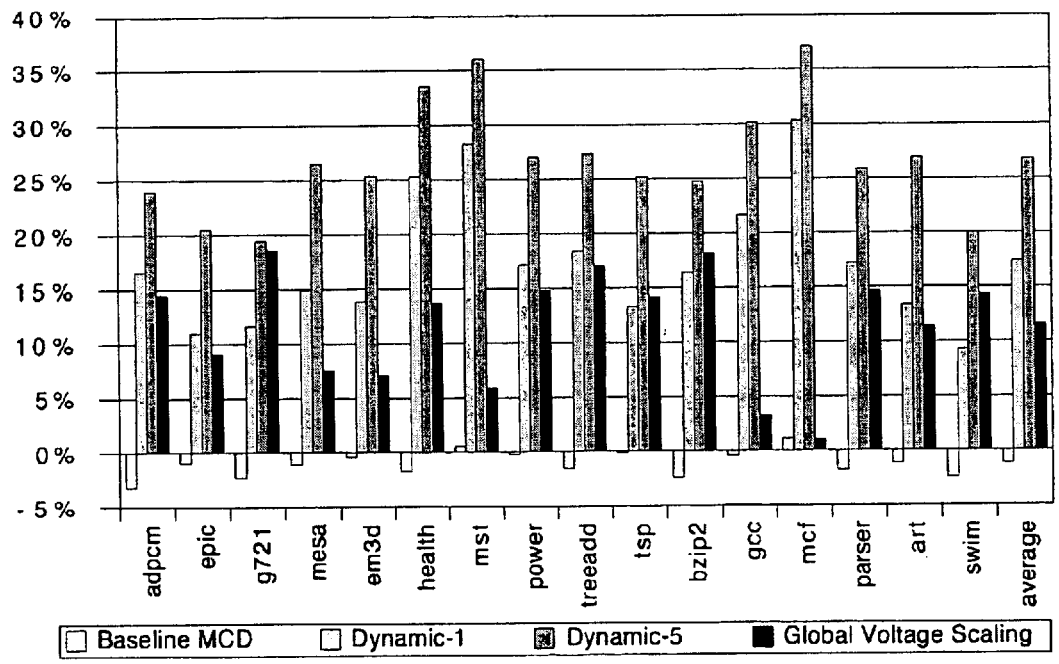
FIG. 6 shows energy saving results.
Figure 7:
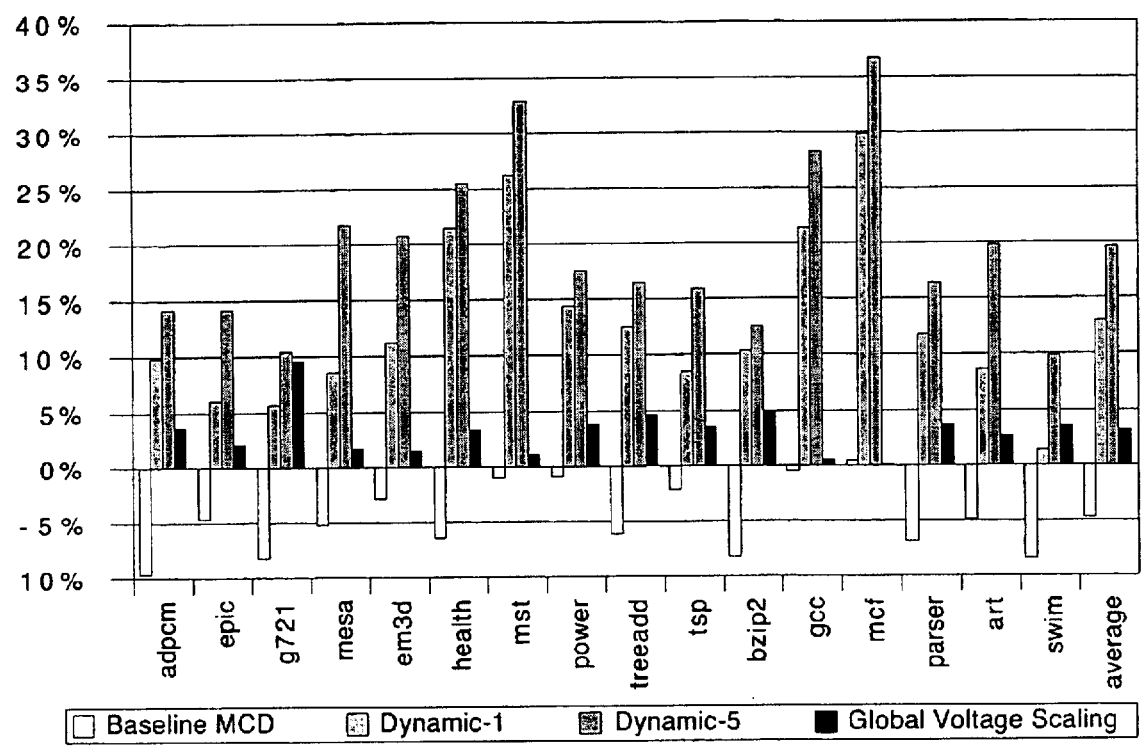
FIG. 7 shows energy-delay improvement results.

FIGS. 5, 6, and 7 display the performance degradation, energy savings, and change in energy×delay of the base-base-line MCD, dynamic 1%, dynamic 5%, and global configurations with respect to the baseline configuration, under the XScale model of voltage and frequency scaling. The Transmeta model produced far less promising results than the XScale model. Because of the roughly 15 µs required to re-lock the PLL under the Transmeta model, reconfigurations are profitable much more rarely than they are under the XScale model, and energy improvements are much less. We will return to a comparison of the Transmeta and XScale models after discussing the XScale results in more detail.

The baseline MCD design, which simply uses multiple clock domains with no voltage or frequency scaling, shows an average performance degradation of less than 4%, with average energy cost of 1.5%. The resulting impact on energy-delay product approaches −10% for adpcm and −5% overall. Note that any overheads introduced by the algorithms add directly to this baseline MCD overhead. For instance, the average dynamic 5% performance overhead is almost 10% or roughly what might be expected given the target degradation of 5% above the base-line MCD.

Our second observation is that the overall energy savings of the global approach is similar to its performance degradation, and averages less than 12% across the sixteen benchmarks. This result is somewhat counterintuitive, since when both frequency and voltage are reduced linearly by the same percentage, performance drops linearly with frequency, yet energy drops quadratically with voltage. Recall, however, that in our model a four-fold change in frequency (from 1 GHz down to 250 MHz) results in a less than two-fold change in voltage (from 1.2 V down to 0.65 V, modeled as 2.0 V to 1.0833 V in Wattch). As discussed above, this difference is due to the compression of voltage ranges relative to frequency ranges in successive process generations, as voltages are scaled down relative to threshold voltage, and frequencies are scaled up. The slope of the voltage curve has become much less steep than that of the frequency curve, greatly diminishing the quadratic effect on energy of a voltage reduction.

The MCD approaches, by contrast, achieve significant energy and energy×delay improvements with respect to the baseline configuration, with a comparatively minor overall performance degradation. For example, the dynamic 5% configuration achieves an average overall energy reduction of 27% and an energy×delay improvement of almost 20% relative to the baseline configuration, while incurring a performance degradation of less than 10% across the sixteen benchmarks under the XScale model. The dynamic 1% algorithm, which tries to more strictly cap the performance degradation at the expense of energy savings, trades off a significant energy savings to achieve this goal, resulting in an energy×delay improvement of roughly 13%. Even so, this still far exceeds the 3% energy×delay improvement obtained with the global approach.

In several cases the opportunity to hide latency behind cache misses allows actual performance degradation to be significantly less than what one might expect from the frequencies chosen by the dynamic algorithm. In particular, the slack associated with L1 data cache misses often allows our reconfiguration tool to scale the integer and floating-point domains without significantly impacting overall performance (due to the fact that the available ILP is not sufficient to completely hide the miss latency), even when the utilization for these domains is high. The load/store domain, of course, must continue to operate at a high frequency in order to service the misses as quickly as possible, since the second level cache is in the same domain (unless we have a lot of level-two cache misses as well). The impact of misses can be seen in gcc (dynamic 1%), where the cache miss rate is high (12.5%) and the average frequency of the integer domain drops to approximately 920 MHz, but total performance degradation is less than 1%.

By contrast, branch mispredictions do not provide an opportunity for dynamic scaling: the dependence chain developed to resolve a branch precludes significant frequency reductions in the integer domain, and sometimes in the load/store domain as well. Applications that experience a high branch mispredict rate are likely to show performance degradation in accordance with frequency slowdown. This effect can be seen in swim, where the energy savings barely exceeds the performance degradation. (Here the floating point domain must also remain at a high frequency because of high utilization.)

The dynamic algorithm performs poorest with respect to global voltage scaling in g721. This is an integer benchmark with a well balanced instruction mix, high utilization of the integer and load/store domains, a low cache miss rate, a low branch misprediction rate, and high baseline MCD overheads. Its IPC is relatively high (above 2), and the integer and load/store domains must run near maximum speed in order to sustain this. The floating point domain can of course be scaled back to 250 MHz, but because of the high activity levels in the other domains, the resulting energy savings is a smaller fraction of total processor energy than it is in most of the other integer applications.

Figure 8A:
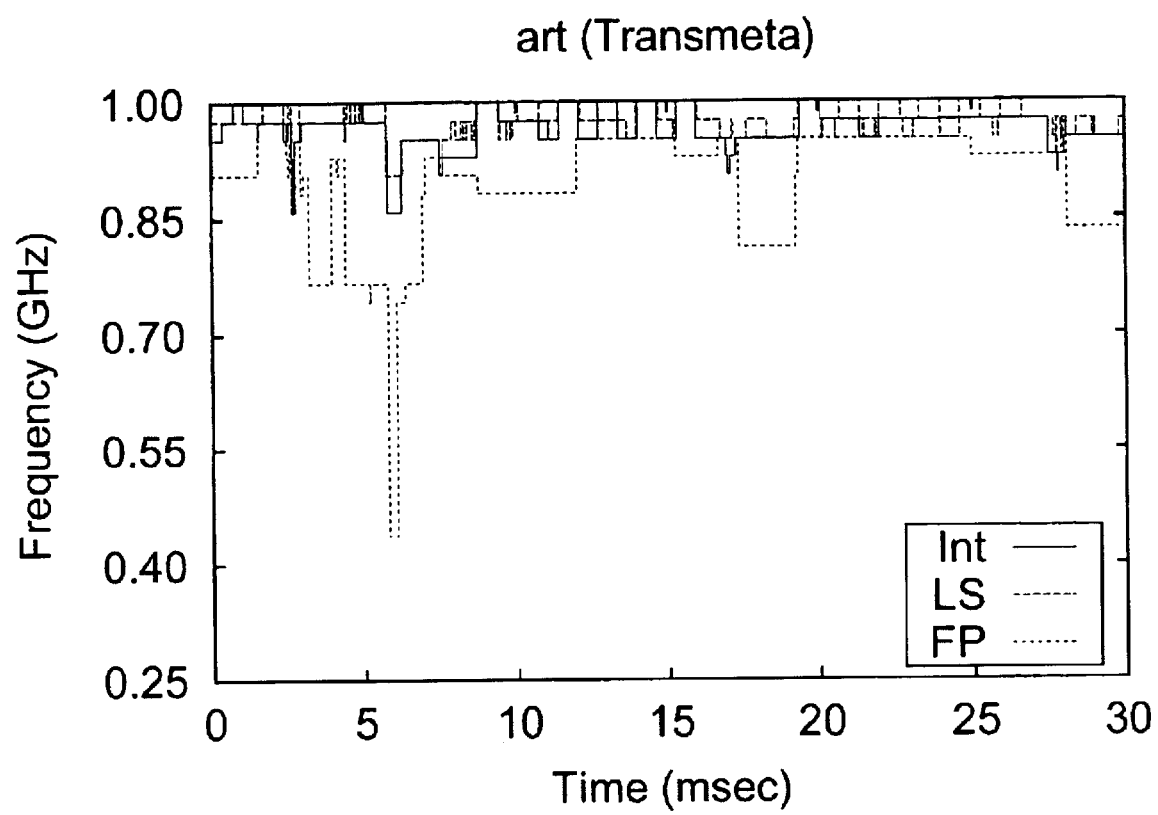
FIGS. 8A and 8B show frequency changes for art generated by our off-line algorithm for the dynamic 1% configuration for Transmeta and XScale, respectively.
Figure 8B:
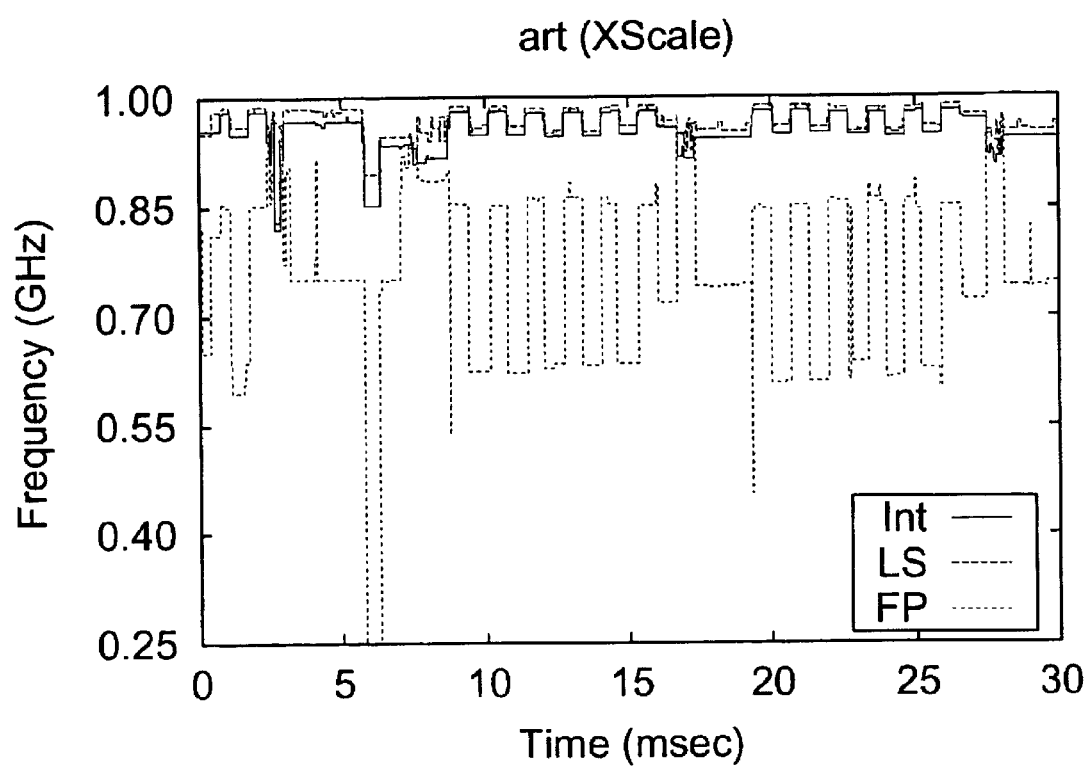

Comparing FIGS. 5–7 with corresponding results (not shown here) under the Transmeta scaling model, we found that the XScale model enables us to achieve significantly higher energy savings for a given level of performance degradation. The reasons for this result are illustrated in FIGS. 8A and 8B, which display the frequency settings chosen by our reconfiguration tool for a 30 ms interval of the art benchmark, with a target performance degradation of 1%. In comparing FIGS. 8A and 8B, note that under the XScale model (FIG. 8B) we are able both to make a larger number of frequency changes and to make those changes over a wider range of frequencies. In particular, while art is a floating-point intensive application, there are many instruction intervals during which we can safely scale back the floating-point domain. Because of its 10–20 µs PLL relock penalty, the Transmeta model does not allow us to capture this comparatively short-term behavior.

Figure 9A:
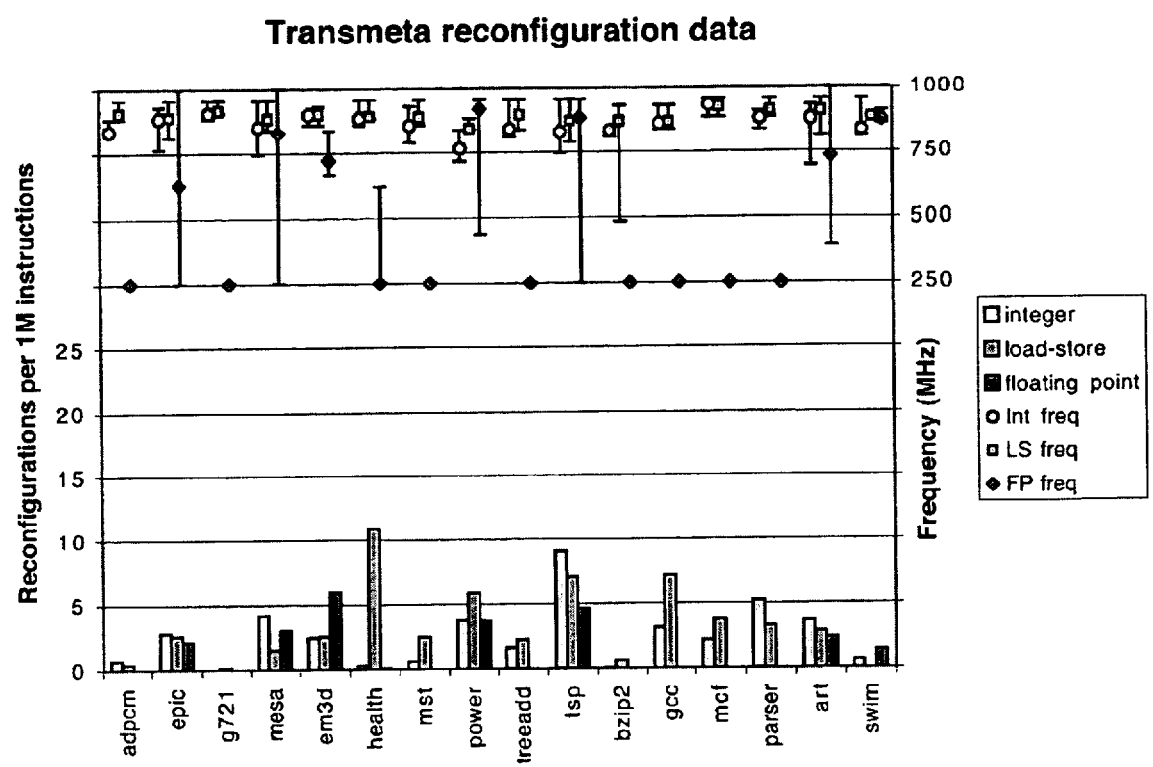
FIGS. 9A and 9B show summary statistics for intervals chosen by the off-line tool for the dynamic 5% configuration for Transmeta and XScale reconfiguration data, respectively.
Figure 9B:
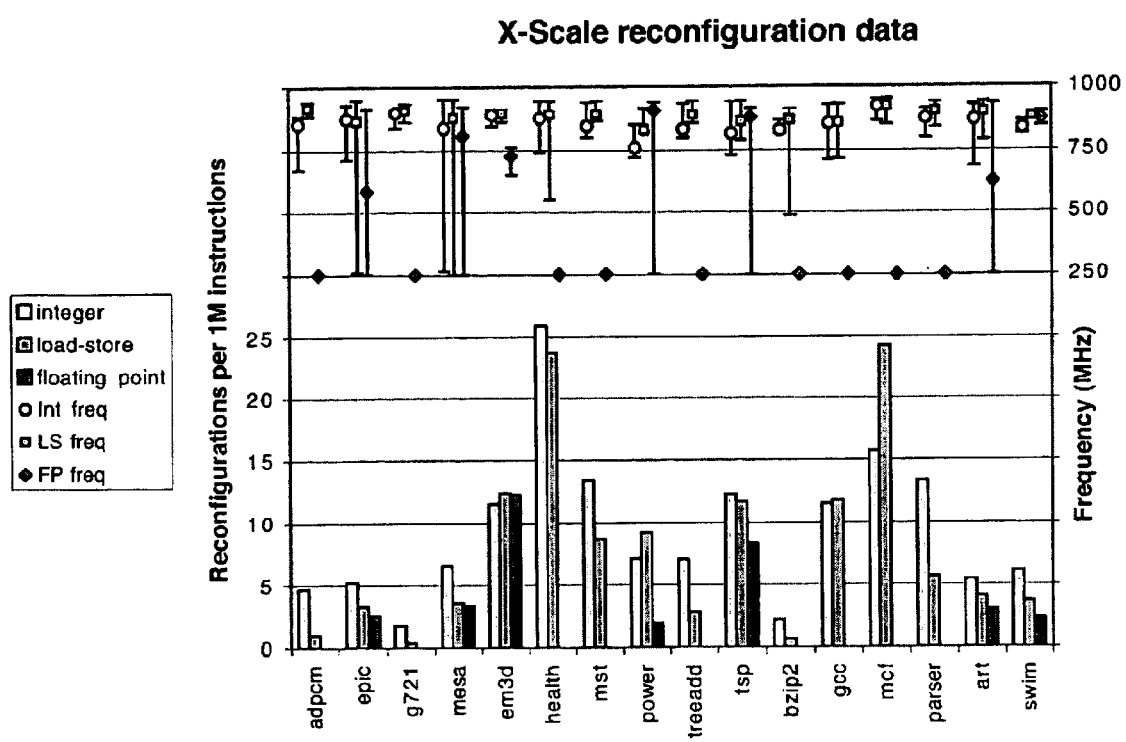

FIGS. 9A and 9B present summary statistics for the intervals chosen by our off-line reconfiguration tool in all 16 applications, under both the Transmeta and XScale models. Those figures show summary statistics for intervals chosen by the off-line tool for the dynamic 5% configuration for Transmeta and XScale reconfiguration data, respectively. Solid bars indicate, for the integer, load-store, and floating-point domains, the number of reconfigurations requested per 1 million instructions. Points above the bars indicate the average frequencies chosen for those domains. "Error bars", where shown, indicate the range of dynamic frequencies for the domain. While the average frequencies chosen for the integer, load-store, and floating-point domains are similar in the two graphs, the total number of reconfigurations is much lower under the Transmeta model, and the frequency ranges are narrower.

FIGS. 8A through 9B all illustrate the value of using different frequencies in different clock domains: by controlling these frequencies independently we can maintain the required frequency in domains that are critical to performance, while aggressively scaling those domains that are less performance-critical. The floating-point domain in particular can be scaled back to the lowest available frequency in many applications, including some that include non-trivial numbers of floating-point operations. Note, however, that due to clock gating, the floating point domain is often not the largest source of energy dissipation for integer programs: the integer domain often is the largest source and thus even modest adjustments of its domain voltage yield significant energy savings. Furthermore, although one would expect dynamic scaling to reduce static power as well, we have not quantified the corresponding contribution to the energy savings. Dynamic voltage gating might achieve additional savings (given appropriate support for saving/restoring critical processor state), and would seem to be a promising avenue for future research.

Several manufacturers, notably Intel [21] and Transmeta [16], have developed processors capable of global dynamic frequency and voltage scaling. Since minimum operational voltage is roughly proportional to frequency, and power is roughly proportional to the voltage squared, this dynamic scaling can be of major benefit in applications with real-time constraints for which the processor as a whole is over-designed: for example, video rendering. Marculescu [23] and Hsu et al. [18] evaluated the use of whole-chip dynamic voltage scaling with minimal loss of performance using cache misses as the trigger [23]. Other work [7, 26] has also begun to look at steering instructions to pipelines or functional units running statically at different speeds so as to exploit scheduling slack in the program to save energy. Our contribution is to demonstrate that a microprocessor with multiple clock domains provides the opportunity to reduce power consumption on a variety of different applications without a significant performance impact by reducing frequency and voltage in domains that do not contribute significantly to the critical path of the current application phase.

Govil et al. [15] and Weiser et al. [31] describe interval-based strategies to adjust the CPU speed based on processor utilization. The goal is to reduce energy consumption by attempting to keep the processor 100% utilized without significantly delaying task completion times. A history based on the utilization in previous intervals is used to predict the amount of work and thereby adjust speed for maximum utilization without work backlog. Pering et al. [25] apply a similar principle to real-time and multimedia applications. Similarly, Hughes et al. [19] use instruction count predictions for frame based multimedia applications to dynamically change the global voltage and frequency of the processor while tolerating a low percentage of missed frame deadlines. Bellosa [2, 3] describes a scheme to associate energy usage patterns with every process in order to control energy consumption for the purposes of both cooling and battery life. Cache and memory behavior as well as process priorities are used as input in order to drive the energy control heuristics. Benini et al. [4] present a system that monitors system activity and provides information to an OS module that manages system power. They use this monitoring system in order to demonstrate how to set the threshold idle time used to place a disk in low-power mode. Our work differs in that we attempt to slow down only those parts of the processor that are not on an application's critical path.

Fields et al. [12] use a dependence graph similar to ours, but constructed on the fly, to identify the critical path of an application. Their goal is to improve instruction steering in clustered architectures and to improve value prediction by selectively applying it to critical instructions only. We use our graph off-line in order to slow down non-critical program paths. Li et al. [22] explore the theoretical lower bound of energy consumption assuming that both the program and the machine are fully adjustable. Assuming equal energy dissipation in all hardware components, they show that a program with balanced load on all components consumes less energy than one with significant variance.

Childers et al. [9] propose to trade IPC for clock frequency. The user requests a particular quality of service from the system (expressed in MIPS) and the processor uses an interval-based method to monitor the IPC and adjust the frequency and voltage accordingly. In their work, a process with high IPC will run at a low clock frequency while a process with low IPC will run at a high clock frequency, which is contrary to what is required for some applications (e.g., when low IPC is due to high miss rates). Our techniques work to achieve the exact opposite in order to provide maximum performance with minimum energy.

While a preferred embodiment of the present invention has been set forth above, those skilled in the art who have reviewed the present disclosure will readily appreciate that other embodiments can re realized within the scope of the invention. For example, numerical values and fabrication techniques are illustrative rather than limiting. Also, while four domains have been disclosed, it is possible to implement a processor with more or fewer domains and with different boundaries among the domains. Other possible variations of the invention have been noted above. Therefore, the present invention should be construed as limited only by the appended claims.

We claim:

1. A multiple-clock-domain microprpcessor comprising:

a plurality of domains;

for each of the plurality of domains, a clock for separately generating a clock signal at a frequency for that domain, the frequency being dynamically changeable independently of the frequencies of the clock signals generated for others of the plurality of domains; and for each of the plurality of domains, a voltage input for receiving a voltage which is dynamically changeable independently of the voltages applied to said others of the plurality of domains.

2. The microprocessor of claim 1, wherein each said clock comprises a phase-locked loop, and wherein the microprocessor further comprises means for receiving an externally generated clock signal and for supplying the externally generated clock signal to each said phase-locked loop.

3. The microprocessor of claim 1, wherein there are at least four of said domains.

4. The microprocessor of claim 1, wherein the microprocessor is programmed to determine a slack in processing in one of the domains and to reduce the clock frequency and the voltage in said one of the domains to reduce the slack.

5. The microprocessor of claim 1, further comprising a queue for communication between at least two of the domains.

6. The microprocessor of claim 5, wherein the queue has a Full flag and an Empty flag, and wherein the microprocessor is programmed to prevent a write to the queue when the Full flag is asserted, until the Full flag is deasserted; and to prevent a read from the queue when the Empty flag is asserted, until the Empty flag is deasserted.

7. The microprocessor of claim 6, wherein the queue is implemented as a dual-ported SRAM.

8. A method of operating a microprocessor, the method comprising:

(a) providing a plurality of domains in the microprocessor;

(b) clocking each of the domains separately at a clock frequency;

(c) applying a voltage to each of the domains separately;

(d) operating the microprocessor such that each domain operates synchronously, while the domains operate asynchronously relative to one another; and (e) dynamically controlling the clock frequency and the voltage in each of the plurality of domains independently of the clock frequencies and the voltages in others of the plurality of domains.

9. The method of claim 8, wherein step (e) comprises:

(i) determining a slack in processing in one of the domains; and (ii) reducing the clock frequency and the voltage in said one of the domains to reduce the slack.

10. The method of claim 8, wherein step (d) comprises providing a queue for communication between at least one of the domains.

11. The method of claim 10, wherein the queue has a Full flag and an Empty flag, and wherein step (d) further comprises:

preventing a write to the queue when the Full flag is asserted, until the Full flag is deasserted; and preventing a read from the queue when the Emply flag is asserted, until the Empty flag is deasserted.

12. The method of claim 8, wherein there are at least four of said domains.

* * * * *

UNITED STATES PATENT AND TRADEMARK OFFICE
CERTIFICATE OF CORRECTION

| | | |
|---|---|---|
| PATENT NO. | : 7,089,443 B2 | Page 1 of 1 |
| APPLICATION NO. | : 10/762550 | |
| DATED | : August 8, 2006 | |
| INVENTOR(S) | : Albonesi et al. | |

It is certified that error appears in the above-identified patent and that said Letters Patent is hereby corrected as shown below:

Column 17, line 9, in Claim 1, delete "multiple-clock-domain" and insert -- multiple clock domain --.

Column 17, line 9, in Claim 1, delete "microprpcessor" and insert -- microprocessor --.

Column 18, line 25, in Claim 10, delete "one" and insert -- two --.

Column 18, line 33, in Claim 11, delete "Emply" and insert -- Empty --.

Signed and Sealed this
Fourteenth Day of June, 2011

David J. Kappos
*Director of the United States Patent and Trademark Office*